United States Patent
Kunisada et al.

(10) Patent No.: US 9,676,635 B2
(45) Date of Patent: Jun. 13, 2017

(54) METHOD FOR PRODUCING AQUEOUS ZIRCONIUM CHLORIDE SOLUTION

(71) Applicant: DAIICHI KIGENSO KAGAKU KOGYO CO., LTD., Osaka-shi, Osaka (JP)

(72) Inventors: Taichi Kunisada, Osaka (JP); Nobutaka Nochioka, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days.

(21) Appl. No.: 15/109,736

(22) PCT Filed: Dec. 17, 2014

(86) PCT No.: PCT/JP2014/083433
§ 371 (c)(1),
(2) Date: Jul. 5, 2016

(87) PCT Pub. No.: WO2015/107830
PCT Pub. Date: Jul. 23, 2015

(65) Prior Publication Data
US 2016/0326009 A1 Nov. 10, 2016

(30) Foreign Application Priority Data
Jan. 16, 2014 (JP) .................. 2014-006115

(51) Int. Cl.
*C01G 25/04* (2006.01)
*C01G 25/02* (2006.01)

(52) U.S. Cl.
CPC ............ *C01G 25/04* (2013.01); *C01G 25/02* (2013.01); *C01P 2002/72* (2013.01); *C01P 2006/80* (2013.01)

(58) Field of Classification Search
CPC ..... C01G 25/04; C01G 25/02; C01P 2006/80; C01P 2002/72
See application file for complete search history.

(56) References Cited

FOREIGN PATENT DOCUMENTS

| JP | 49-49897 A | 5/1974 |
| JP | 63-21222 A | 1/1988 |

(Continued)

OTHER PUBLICATIONS

International Search Report dated Mar. 31, 2015, issued in counterpart International Application No. PCT/JP2014/083433 (2 pages).

(Continued)

*Primary Examiner* — Anthony J Zimmer
*Assistant Examiner* — Syed Iqbal
(74) *Attorney, Agent, or Firm* — Westerman, Hattori, Daniels & Adrian, LLP

(57) ABSTRACT

A method for producing an aqueous zirconium chloride solution includes: grinding zircon sand to an average particle diameter of 10 μm or less; adding a sodium compound to the ground zircon sand to thereby obtain a mixture; firing the mixture in an iron container at 400° C. or less to thereby obtain a decomposed product; firing the decomposed product in a stainless-steel container at 400 to 1,100° C. to thereby obtain a fired product; dispersing the fired product in water to prepare a dispersion, and washing the fired product with water while adjusting the temperature of the dispersion to 70° C. or less, thereby obtaining a water-washed cake; washing the water-washed cake with hydrochloric acid with a pH of 1 to 6 to thereby obtain zirconium hydrate; and dissolving the zirconium hydrate in hydrochloric acid, and then removing insoluble components to thereby obtain a salt solution.

7 Claims, 3 Drawing Sheets

(56) References Cited

FOREIGN PATENT DOCUMENTS

| JP | 1-215719 A | 8/1989 | |
|---|---|---|---|
| JP | 3-265519 A | 11/1991 | |
| JP | 03265519 A * | 11/1991 | |
| JP | 6-157039 A | 6/1994 | |
| JP | 6-191849 A | 7/1994 | |
| JP | 3427211 B2 * | 7/2003 | ............ C01B 39/20 |
| JP | 2005-119895 A | 5/2005 | |
| JP | 4403451 B2 * | 1/2010 | ............ C01G 25/04 |

OTHER PUBLICATIONS

Decision to Grant a Patent dated Sep. 29, 2015, issued in counterpart Japanese Patent Application No. 2014-006115, w/English machine translation (4 pages).

Notification of Reasons for Refusal dated Mar. 24, 2015, issued in counterpart Japanese Patent Application No. 2014-006115, w/English machine translation (4 pages).

Written Argument dated May 11, 2015, filed in counterpart Japanese Patent Application No. 2014-006115, w/English machine translation (3 pages).

Written Amendment dated May 11, 2015, filed in counterpart Japanese Patent Application No. 2014-006115, w/English machine translation (3 pages).

\* cited by examiner

METHOD FOR PRODUCING AQUEOUS ZIRCONIUM CHLORIDE SOLUTION

TECHNICAL FIELD

The present invention relates to a method for producing an aqueous zirconium chloride solution using zircon sand and an alkali compound as starting materials.

BACKGROUND ART

Aqueous zirconium chloride solutions are used in the production of various zirconium compounds, such as zirconium oxychloride, zirconium hydroxide, basic zirconium sulfate, and zirconium composite oxide, and are important intermediate materials. Therefore, it is very advantageous to produce aqueous zirconium chloride solutions having a low impurity content at low cost and with high production efficiency.

An aqueous zirconium chloride solution is generally known to be produced in the following manner. First, a raw material called "zircon sand" is heat-melted or hydrothermally treated in the presence of alkali. Next, the obtained reaction mixture is washed with water to dissolve mainly alkali silicate in water, and the alkali silicate is removed by filtration. Subsequently, the concentrate comprising alkali zirconate and zirconium hydrate ($ZrO(OH)_x$) as main components obtained by the filtration is dissolved in hydrochloric acid to obtain an aqueous zirconium chloride solution. Finally, silica remaining in the aqueous zirconium chloride solution is rendered insoluble, and the silica is then filtered off, thereby obtaining a purified aqueous zirconium chloride solution.

An example of a modification of this production method includes dissolving a concentrate of alkali zirconate and zirconium hydrate in concentrated hydrochloric acid at a temperature of 60 to 100° C., adding 0.2 to 1.0 g/L of gelatin to coagulate and precipitate gelled silica, and filtering the gelled silica to separate the silica.

However, this method has drawbacks in that hydrated silica (e.g., gelled silica or insoluble silica) has poor filterability, and in that a large amount of dissolved silica remains in the aqueous zirconium chloride solution. Insoluble silica, which is in the form of a gel, has a large volume, and contains a considerable amount of zirconium in the gel form. As a result, this causes a reduction in zirconium yield. Moreover, sodium in sodium zirconate cannot be sufficiently removed only by water washing, causing an increase in the sodium content of the aqueous zirconium chloride solution. Furthermore, heat-melting of zircon sand was conventionally performed in an iron container by heating at 600 to 900° C. in the air. Accordingly, the iron container was severely corroded, causing an increase in the iron content of the aqueous zirconium chloride solution.

Techniques for improving the method for producing aqueous zirconium chloride solutions are also disclosed, for example, in PTL 1, PTL 2, and PTL 3.

PTL 1 discloses a method for producing zirconium oxychloride with a low silica content, the method comprising the steps of:

i) mixing zirconium silicate fine particles with alkali, and subjecting the resultant to hydrothermal treatment at or above the boiling point;

ii) subjecting the slurry obtained in the hydrothermal treatment step to solid-liquid separation, returning the separated liquid to step i), dispersing the separated solid content in water, and conducting heat treatment;

iii) dispersing the solid content obtained by subjecting the heat-treated slurry to solid-liquid separation in water, and neutralizing the solid content using acid;

iv) treating the solid content obtained by subjecting the neutralized slurry to solid-liquid separation with hydrochloric acid to elute soluble components;

v) subjecting the slurry that has been treated with hydrochloric acid to solid-liquid separation to obtain an acidic aqueous solution of zirconium oxychloride (corresponding to an aqueous zirconium chloride solution) as a separated liquid; and vi) concentrating the acidic aqueous solution to obtain zirconium oxychloride octahydrate by crystallization.

In the technique of PTL 1, the alkali decomposition of the zircon sand is performed by hydrothermal treatment in an autoclave; thus, a large amount of capital investment is necessary for mass production. Further, in the technique of PTL 1, the dispersion cake obtained by alkali decomposition is neutralized with hydrochloric acid, the neutralized slurry is subjected to solid-liquid separation, and then the resulting solid content is redispersed in hydrochloric acid to extract soluble components. Using such a method makes it difficult to obtain an aqueous zirconium chloride solution with a high yield. Further, there is a problem in that a large amount of sodium tends to remain in the aqueous zirconium chloride solution. PTL 2 discloses a method for producing an aqueous zirconium chloride solution that comprises the steps of leaching alkali-treated zircon sand with water, followed by filtration to obtain a water-leached cake (same as a cake), and extracting the cake with hydrochloric acid. In this production method, water is added to the cake to form a slurry, and hydrochloric acid is added to the slurry so that the zirconium chloride concentration calculated as $ZrO_2$ is 9 to 16 wt %, and so that the free HCl concentration is 1 to 7 wt %. Then, filtration is conducted, thereby obtaining an aqueous zirconium chloride solution.

In the technique of PTL 2 described above, an aqueous zirconium chloride solution is obtained by neutralizing the dispersion cake that has been subjected to alkali decomposition by slowly adding hydrochloric acid to the dispersion cake at a fixed rate, maintaining the pH of the dispersion cake at neutral, further adding hydrochloric acid, and then subjecting the dispersion cake to solid-liquid separation. The aqueous zirconium chloride solution obtained by this method has a low silica content and gives a high yield; however, a long time is necessary for the steps of adding hydrochloric acid and extracting zirconium. Even by the production method disclosed in PTL 2, the removal of sodium is insufficient, and a large amount of sodium thus remains in the aqueous zirconium chloride solution. Moreover, the technique of PTL 2 is not considered as a method for increasing the decomposition rate of zircon sand, or for preventing the incorporation of impurities into the aqueous zirconium chloride solution.

PTL 3 discloses a method for producing an aqueous zirconium chloride solution, the method comprising:

(i) step 1 of obtaining a water-leached cake by leaching alkali-treated zircon sand in water, followed by filtration;

(ii) step 2 of preparing a dried intermediate by adding hydrochloric acid to the water-leached cake and drying the resultant gel, or by adding hydrochloric acid to the water-leached cake and spray-drying the resultant slurry before gelling;

(iii) step 3 of preparing a suspension by adding hydrochloric acid to the dried intermediate, wherein the hydrochloric acid is added in such a manner that the liquid phase of the resultant suspension has a zirconium chloride concentration of 5 to 16 mass % calculated as $ZrO_2$, and a free HCl concentration of 1 to 10 mass %; and (iv) step 4 of preparing an aqueous zirconium chloride solution by filtering the suspension.

In the production method disclosed in PTL 3, the gel or slurry is once dried to form a dried intermediate in step 2, and it is therefore possible to produce a high-purity aqueous zirconium chloride solution with a low dissolved silica content in step 4.

However, the technique of PTL 3 includes a step of drying the gel obtained by adding hydrochloric acid to the water-leached cake, and the drying takes a long time. Moreover, this technique requires facilities, such as hydrochloric acid gas treatment equipment and a spray dryer. Thus, a large amount of capital investment is necessary for mass production. Furthermore, the feature of the technique of PTL 3 is that silica is converted into a silica polymer that has excellent deposition properties and filterability; however, the obtained silica polymer is swollen, and hydrochloric acid remains therein; thus, it takes a long time to perform treatment. In addition, two hydrochloric acid addition steps are required. In addition, problems remain in the processing speed, capital investment, etc.

CITATION LIST

Patent Literature

PTL 1: JPH03-265519A
PTL 2: JP3427211B
PTL 3: JP4403451B

SUMMARY OF INVENTION

Technical Problem

As described above, the techniques disclosed in PTL 1 to PTL 3 have problems, i.e., the need for a long treatment time to obtain aqueous zirconium chloride solutions, and a low production efficiency. They also have common problems in that the decomposition rate of zircon sand is low, and in that a large amount of sodium and other impurities is incorporated. Furthermore, all of these production methods have a problem in that they require a large capital investment.

In particular, there is a recent demand for various zirconium compounds, including zirconium oxide, to exhibit higher performance by reducing the impurity content as much as possible. Therefore, for aqueous zirconium chloride solutions used as important intermediates for various zirconium compounds, there is a strong demand in the market for aqueous zirconium chloride solutions that have a low content of impurities, such as sodium, iron, and silicon.

The present invention has been made in consideration of the above circumstances. An object of the present invention is to provide a method for producing an aqueous zirconium chloride solution that has a higher decomposition rate of zircon sand and a lower impurity content, as compared with conventional methods.

Solution to Problem

The present inventors conducted extensive research to achieve the above object. As a result, in the production of an aqueous zirconium chloride solution, first, they succeeded in reducing the decomposition temperature of zircon sand by grinding zircon sand, which was a raw material, to a predetermined particle size. Next, the zircon sand was decomposed in two stages, and the water washing temperature was reduced. They found that the above object could be achieved in the above manner. Thus, the present invention has been completed.

Specifically, the present invention relates to the following method for producing an aqueous zirconium chloride solution.

1. A method for producing an aqueous zirconium chloride solution, the method comprising:

(1) step 1 of grinding zircon sand to an average particle diameter of 10 µm or less;

(2) step 2 of adding a sodium compound to the ground zircon sand in (1) to thereby obtain a mixture;

(3) step 3 of firing the mixture in (2) in an iron container at 400° C. or less to thereby obtain a decomposed product;

(4) step 4 of firing the decomposed product in (3) in a stainless-steel container at 400 to 1,100° C. to thereby obtain a fired product;

(5) step 5 of dispersing the fired product in (4) in water to prepare a dispersion, and washing the fired product with water while adjusting the temperature of the dispersion to 70° C. or less, thereby obtaining a water-washed cake;

(6) step 6 of washing the water-washed cake in (5) with hydrochloric acid with a pH of 1 to 6 to thereby obtain zirconium hydrate; and (7) step 7 of dissolving the zirconium hydrate in (6) in hydrochloric acid, and then removing insoluble components to thereby obtain a salt solution.

2. The method for producing an aqueous zirconium chloride solution according to item 1, wherein the zircon sand in (1) is ground to an average particle diameter of 2 µm or less.

3. The method for producing an aqueous zirconium chloride solution according to item 1 or 2, wherein the sodium compound in (2) is a 20 to 90 wt. % aqueous sodium hydroxide solution.

4. The method for producing an aqueous zirconium chloride solution according to any one of items 1 to 3, wherein the temperature of the dispersion in (5) is adjusted to 40° C. or less.

Advantageous Effects of Invention

The method for producing an aqueous zirconium chloride solution according to the present invention can produce an aqueous zirconium chloride solution that has a higher decomposition rate of zircon sand and a lower content of impurities, such as sodium and iron, as compared with conventional methods. Furthermore, according to the above production method, production facilities can be easily scaled-up, and capital investment costs can therefore be significantly reduced. Thus, the production method can be suitably used in relevant fields.

DESCRIPTION OF EMBODIMENTS

Embodiments of the method for producing an aqueous zirconium chloride solution according to the present invention are described in detail below.

Figure 1:
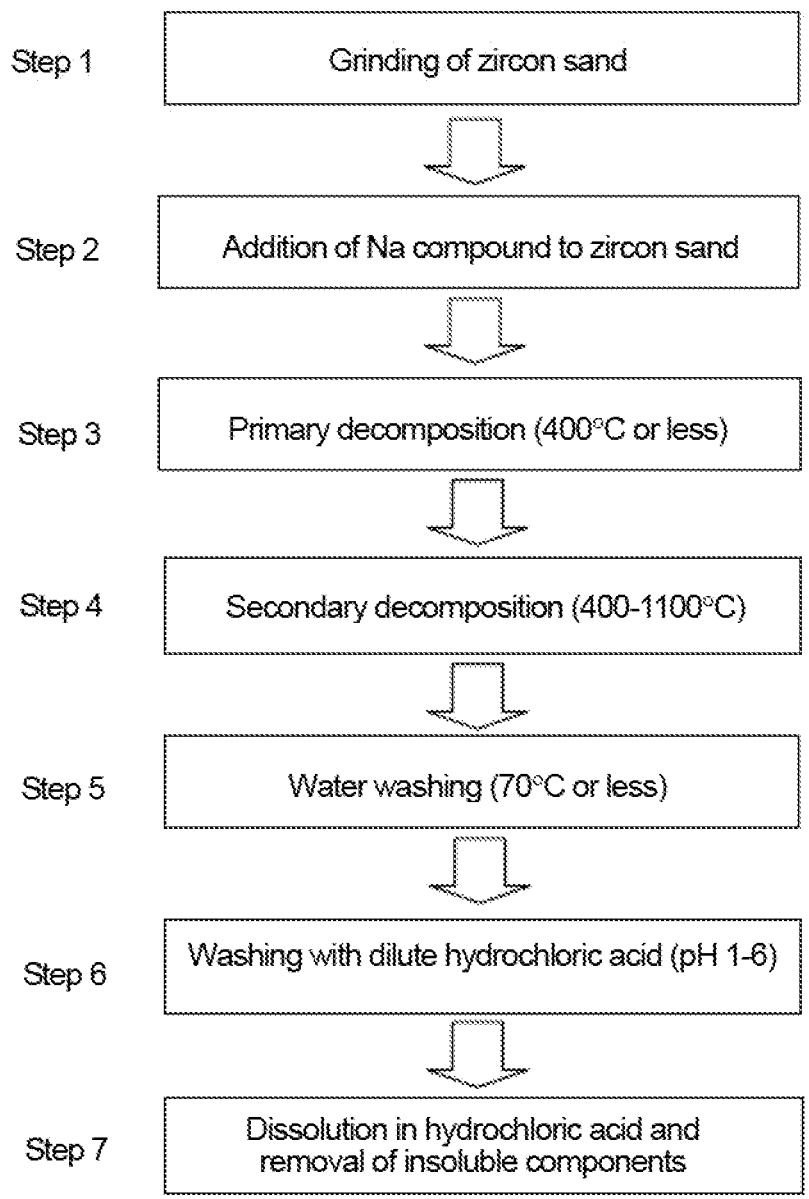
FIG. 1 shows an outline of the process flow of the method for producing an aqueous zirconium chloride solution according to the present invention.

FIG. 1 shows the process flow of the method for producing an aqueous zirconium chloride solution. Each step in the process flow is sequentially described in detail below.

1. Step of Grinding Zircon Sand

The method for producing an aqueous zirconium chloride solution according to the present invention comprises (1) a step of grinding zircon sand to an average particle diameter of 10 Mm or less (hereinafter simply referred to as "step 1").

The zircon sand (chemical formula: $ZrSiO_4$) used in step 1 is a starting material for producing an aqueous zirconium chloride solution. Commercially available zircon sand can be used. Although the production area, etc., are not particularly limited, it is preferable to use zircon sand containing 40 wt. % or less of silicon oxide component and having a radioactive element content (uranium and thorium) of 500 ppm or less. Zircon sand has generally undergone various types of beneficiation, but not grinding treatment, etc., and is composed of spherical particles of several 10 μm to several 100 μm.

Fine particles of zircon sand obtained by grinding have a higher specific surface area and increased reactivity. As a result, the decomposition temperature of zircon sand can be reduced, and the decomposition rate of zircon sand can be improved to a higher degree than that of zircon sand that is not ground.

Zircon sand can be ground by using a generally used grinder. Examples of grinders include a ball mill, a vibration mill, a jet mill, a planetary mill, a roll mill, a rod mill, and the like. Preferable grinders among these are a ball mill, a vibration mill, etc., in terms of the target grain size, cost, and production efficiency.

In step 1, the particle size of the ground zircon sand is set so that the average particle diameter ($D_{50}$ value) is 10 μm or less. The average particle diameter ($D_{50}$) is preferably 5 μm or less, and more preferably 2 μm or less, because the decomposition temperature of zircon sand can be further reduced. The particle diameter mentioned herein is a volume average particle diameter measured by using a SALD-2200 laser diffraction particle size analyzer (produced by Shimadzu Corporation).

Figure 2:
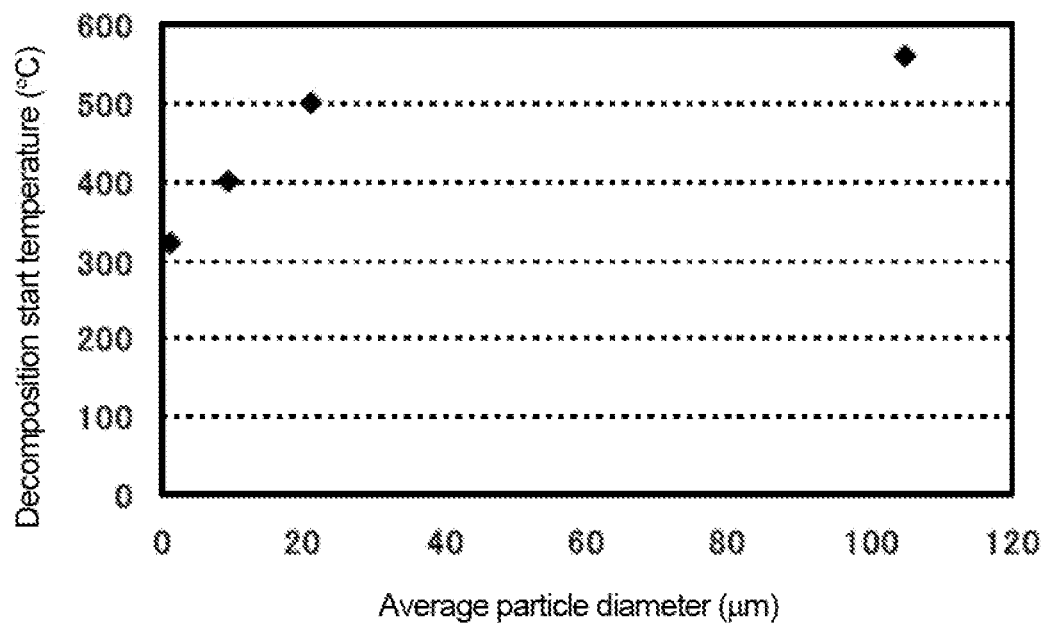
FIG. 2 shows a plot of the relationship between the average particle diameter of zircon sand and the decomposition start temperature.

FIG. 2 shows a graph obtained by plotting the relationship between the average particle diameter of zircon sand and the decomposition start temperature. As is clear from FIG. 2, the decomposition start temperature of unground zircon sand is generally 550 to 570° C., and when the average particle diameter ($D_{50}$) of zircon sand is reduced to 20 μm or less by grinding, the decomposition start temperature begins to decrease. It is also indicated that when the average particle diameter ($D_{50}$) is 10 μm, the decomposition start temperature is 350 to 450° C., and that when the average particle diameter ($D_{50}$) is 1.2 μm, the decomposition start temperature is reduced to 300 to 350° C. As described above, it is revealed that the decomposition temperature of zircon sand strongly depends on its average particle diameter, and that the smaller the average particle diameter, the lower the decomposition temperature.

If contamination by impurities from grinding media, etc., occurs during grinding, acid treatment, drying, firing, and like treatment may be applied. Moreover, if the zircon sand forms aggregates after various treatments, it is preferable to eliminate the aggregates by crushing before the zircon sand is subjected to the subsequent processes.

2. Step of Adding Sodium Compound to Ground Zircon Sand

The method for producing an aqueous zirconium chloride solution according to the present invention comprises (2) a step of adding a sodium compound to the zircon sand ground in step 1 to thereby obtain a mixture (hereinafter simply referred to as "step 2").

The sodium compound used as a raw material is not particularly limited. For example, sodium hydroxide, sodium carbonate, sodium hydrogen carbonate, etc., can be used. Of these, the use of sodium hydroxide is most preferable. Commercially available industrial sodium hydroxide can be used. The sodium compound can be in the form of flakes, granules, powder, or the like, and may be in any form. Alternatively, the sodium compound may be dissolved in water to form an aqueous solution, or may be dissolved in another solvent to form a solution. For example, when sodium hydroxide is used, its form may be any of flakes, granules, etc., or may be an aqueous solution; or various forms can be used in combination. In contrast, if sodium hydroxide is used in the decomposition of the ground zircon sand, the sodium hydroxide, which alone has high viscosity, is not compatible with the zircon sand fine particles, which are less wettable, and segregation is likely to occur. From such a point of view, it is more preferable that sodium hydroxide be used in the form of an aqueous sodium hydroxide solution obtained by adding water to the sodium hydroxide. Viscosity can thereby be reduced, and segregation can be prevented.

The concentration of the above aqueous sodium hydroxide solution is preferably 20 to 90 wt. %, more preferably 30 to 80 wt. %, and even more preferably 40 to 70 wt. %. Although the zircon sand can be decomposed even when the concentration of the aqueous sodium hydroxide solution is less than 20 wt. %, extra heating energy is necessary to concentrate the aqueous sodium hydroxide solution, which may lead to high production costs and low production efficiency. On the other hand, an aqueous sodium hydroxide solution that is as highly concentrated as more than 90 wt. % is not sufficiently compatible with the zircon sand fine particles, as with sodium hydroxide alone; therefore, segregation is likely to occur, possibly leading to a phenomenon in which the decomposition reaction unevenly proceeds.

Mixing of the ground zircon sand with a sodium compound or a solution thereof may be performed using a mixing apparatus, as necessary. Examples of the mixing apparatus include a V-type mixer, a ribbon blender, a kneader, and the like. In particular, an apparatus having alkali resistance may be used.

When the sodium compound is sodium hydroxide, the amount of sodium hydroxide based on the amount of zircon sand can be estimated from the reaction formula; however, in practice, the $NaOH/ZrSiO_4$ weight ratio is preferably 1.1 to 1.4. When the above weight ratio is less than 1.1, the amount of sodium is insufficient, and the decomposition of zircon sand may be less likely to proceed. When the weight ratio is more than 1.4, excessive sodium that does not contribute to decomposition may remain, and the raw material is wasted. In addition, the excessive sodium can be a cause of promoting the corrosion of the metal decomposition container.

In addition to sodium hydroxide, sodium carbonate and sodium hydrogen carbonate can also be used as the sodium compound, and they can be used as a mixture. The amount of sodium carbonate, sodium hydrogen carbonate, or a mixture thereof added to sodium hydroxide is not particularly limited; however, it is preferable to add sodium carbonate, sodium hydrogen carbonate, or a mixture thereof so that the amount of sodium in the aqueous sodium hydroxide solution is 50 mol % or less. Examples of combinations include a combination of "50 mol % of sodium hydroxide and 25 mol % of sodium carbonate," a combination of "60 mol % of sodium hydroxide, 10 mol % of sodium carbonate, and 20 mol % of sodium hydrogen carbonate," and the like. If sodium carbonate and sodium hydrogen carbonate are mixed in a total amount of more than 50 mol %, segregation is likely to occur because they are powder. Since sodium carbonate and sodium hydrogen carbonate are foamed and decomposed in a sodium hydroxide solution at a low temperature of 200° C. or less, they can contribute to the decomposition of zircon sand, together with sodium hydroxide.

3. Step of Firing in Iron Container at 400° C. or Less (Primary Decomposition)

The method for producing an aqueous zirconium chloride solution according to the present invention comprises (3) a step of firing the mixture in step 2 in an iron container at 400° C. or less to thereby obtain a decomposed product (hereinafter simply referred to as "step 3"). In step 3, the zircon sand is primarily decomposed, thereby obtaining primarily decomposed zircon sand. Hereinafter, the decomposed zircon sand may be referred to as "frits."

In the step of primary decomposition of zircon sand, an iron container is used to contain raw materials, such as zircon sand. Iron containers have lower alkali resistance than, for example, stainless-steel containers; however, iron containers are inexpensive and are therefore widely used in relevant fields. If a stainless-steel container is used in step 3, a small amount of heavy metal, such as nickel or chromium, is eluted from the stainless steel by the action of the alkali compound among the raw materials. This causes a decrease in the purity of the finally obtained aqueous zirconium chloride solution, and also causes a large environmental impact. Nickel containers have higher alkali resistance than stainless-steel containers, but are expensive. Accordingly, the use of a nickel container in the primary decomposition significantly increases production costs. There are various ceramic containers that are non-metallic; however, such containers tend to be corroded by the sodium compound, and a large amount of container components is thus incorporated into the frits. For the above reasons, it is necessary to use an iron container in the primary decomposition. In particular, when sodium hydroxide in the form of a solution is used, container corrosion is more likely to be promoted. Accordingly, an iron container is suitably used.

The decomposition start temperature of zircon sand that is not ground is as high as 550 to 570° C. or more, as described above. Therefore, if zircon sand that is not ground is used as a raw material, high-temperature treatment is required. This is a factor in promoting the corrosion of the iron container, and iron derived from the iron container is incorporated into the frits on the order of up to several %. Moreover, after completion of the decomposition reaction, the iron container containing the frits may be further heated to 570° C. or more so as to promote the decomposition reaction of the frits. Since this heating is generally performed in an oxygen environment, iron oxidation is further advanced. In addition, unreacted sodium components present in the frits also promote the corrosion of the iron container. As a result, foreign substances are more likely to be incorporated into the frits.

However, the method for producing an aqueous zirconium chloride solution according to the present invention uses, as a starting material, zircon sand whose reactivity (decomposition properties) is enhanced by the grinding treatment in step 1. Therefore, the decomposition start temperature of the zircon sand is as low as 400° C. or less. The treatment temperature in the primary decomposition can thereby be set to 400° C. or less, and the corrosion of the iron container in the primary decomposition step can be thus prevented. As a result, the incorporation of iron components from the iron container into the frits can be prevented, and a high-purity aqueous zirconium chloride solution can be obtained.

After the frits are obtained by the above primary decomposition, the frits may be taken out from the iron container and naturally cooled, as necessary. The frits are subjected to a subsequent step of secondary decomposition using a stainless-steel container. At this point, the frits are formed by sodium zirconate, sodium silicate, sodium zirconium silicate ($Na_2ZrSiO_5$), undecomposed zircon sand, sodium hydroxide, etc.

4. Step of Firing in Stainless-Steel Container at 400 to 1,100° C. (Secondary Decomposition)

The method for producing an aqueous zirconium chloride solution according to the present invention comprises (4) a step of firing the decomposed product in step 3 in a stainless-steel container at 400 to 1,100° C. to thereby obtain a fired product (hereinafter simply referred to as "step 4").

In step 4, the frits obtained by primary decomposition is transferred to a stainless-steel container, and further fired at 400 to 1,100° C. to obtain a fired product. This step can be called a secondary decomposition step. The stainless-steel container used in this step has more excellent heat resistance and is relatively less expensive than iron containers. Further, since a smaller amount of unreacted sodium remains in the secondary decomposition than in the primary decomposition, the corrosion of the container is less likely to progress. Thus, even if a stainless-steel container is used in the secondary decomposition, chromium, etc., are less likely to be eluted from stainless steel, and the incorporation of chromium, etc., is more likely to be prevented. Although the material of stainless steel is not particularly limited, materials called SUS302 and SUS304, which are free from manganese or molybdenum, are suitable. If a ceramic container is used in the secondary decomposition, the corrosion of the container progresses, causing an increase in impurities in the fired product. Moreover, if an iron container is used in the secondary decomposition, as with the primary decomposition, the heating temperature is higher than the primary decomposition; therefore, iron corrosion is more likely to occur, thereby causing incorporation of iron into the fired product as an impurity.

By the secondary decomposition in step 4, an intermediate, such as sodium zirconium silicate, which causes an increase in the amount of silicon in the aqueous zirconium chloride solution, is decomposed into sodium zirconate and sodium silicate. Further, the zircon sand that has not been decomposed by the primary decomposition is also decomposed in the secondary decomposition step.

The firing temperature in the secondary decomposition is 400 to 1,100° C., preferably 600° C. to 1,000° C., and more preferably 700° C. to 900° C. When the firing temperature exceeds 1,100° C., the corrosion of the container is promoted, and sintering of the frits is also promoted. Furthermore, the decomposed sodium zirconate and sodium silicate are reacted again to form sodium zirconium silicate, thereby causing an increase of impurities.

Figure 3:
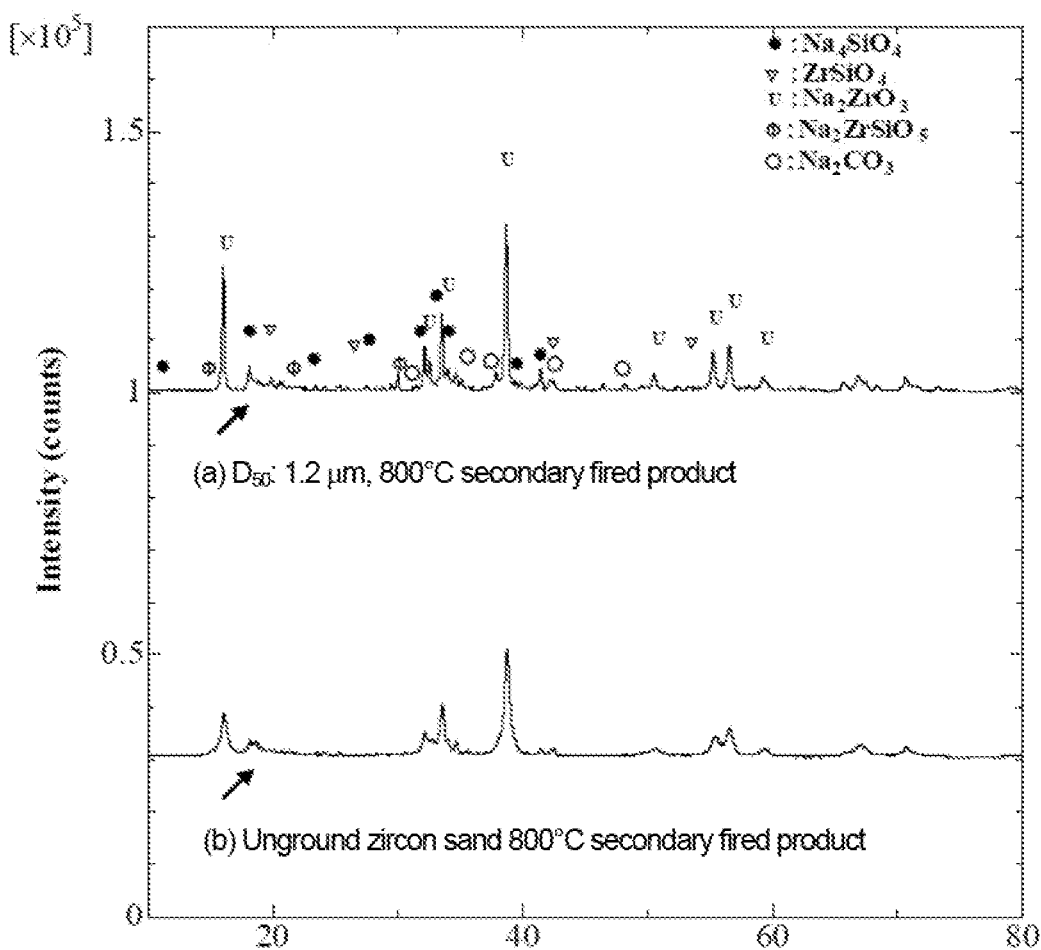
FIG. 3 shows the XRD spectra of frits after secondary decomposition obtained using unground zircon sand or ground zircon sand ($D_{50}$: 1.2 µm) as a starting material.

FIG. 3 shows XRD spectra of the frits (fired product) obtained by steps 1 to 4. In FIG. 3, spectrum (a) (written as "$D_{50}$: 1.2 μm, 800° C. secondary fired product") is obtained from frits using, as a raw material, zircon sand that has been ground so that $D_{50}$ is 1.2 μm; and spectrum (b) (written as "unground zircon sand 800° C. secondary fired product") is obtained from frits using unground zircon sand as a raw material. The frits (a) in FIG. 3 are produced under the same conditions as in Example 1, described later, and the frits (b) in FIG. 3 are produced under the same conditions as in Example 1, except that the grinding treatment (step 1) is not performed.

In FIG. 3, it can be confirmed that the peak of the spectrum of the frits obtained from the ground zircon sand is sharper (i.e., lower half width) than that of the spectrum of the frits obtained from the unground zircon sand. This demonstrates that decomposition of the ground zircon sand fine particles is more promoted than that of the untreated zircon sand, that is, crystallization of sodium zirconate and sodium silicate is promoted.

The frits secondarily decomposed in step 4 can be subjected to a subsequent step of water washing to thereby highly efficiently remove sodium silicate. When the frits after secondary decomposition significantly aggregate, the frits may be crushed with a general coarse grinder, such as a jaw crusher or a roll crusher. However, if the frits are crushed to a particle diameter of several μm, the frits are likely to react with the moisture in the air, and quality may be reduced. Accordingly, the crushed frits are preferably stored by being sealed.

5. Step of Washing Secondarily Decomposed Frits with Water

The method for producing an aqueous zirconium chloride solution according to the present invention comprises (5) a step of dispersing the fired product (frits) obtained in step 4 in water to prepare a dispersion, and adjusting the temperature of the dispersion to 70° C. or less, thereby obtaining a water-washed cake (hereinafter simply referred to as "step 5").

In step 5, the frits (fired product) obtained by secondary decomposition in step 4 are washed with water. In step 5, sodium silicate contained in the frits is removed. The water washing method is suitably a batch method in which the frits are washed by being dispersed in water.

The frits after secondary decomposition contain alkali compounds, such as sodium hydroxide, which remain without contributing to decomposition. For example, when sodium hydroxide remains as an alkali compound, the temperature of a dispersion prepared by dispersing the frits after secondary decomposition in water increases due to the heat of dissolution of the sodium hydroxide (about 45 kJmol$^{-1}$). When the temperature of the dispersion thus increases, the amount of silicon in the frits after water washing consequently increases. This is presumably because sodium silicate undergoes hydrolysis due to the above temperature increase to form a solid silicon compound, and the solid silicon compound is incorporated into the frits. Further, the solid silicon compound is swollen and gelled during the dissolution in hydrochloric acid in the subsequent step of hydrochloric acid dissolution (step 7, described later). Such a gelled product sometimes incorporates target products, such as zirconium chloride. Consequently, this can be a factor in reducing the zirconium yield.

For the above reasons, it is necessary to highly efficiently remove sodium silicate by the water-washing process of step 5.

When the fired product is dispersed in water to prepare a dispersion, the temperature of the dispersion is adjusted to 70° C. or less. Hydrolysis of sodium silicate can thereby be suppressed, and the amount of silicon remaining in the fired product after water washing can be reduced. The temperature of the dispersion is preferably adjusted to 50° C. or less, more preferably 40° C. or less, and particularly preferably 30° C. or less, because the amount of silicon remaining in the fired product after water washing can be further reduced.

Figure 4:
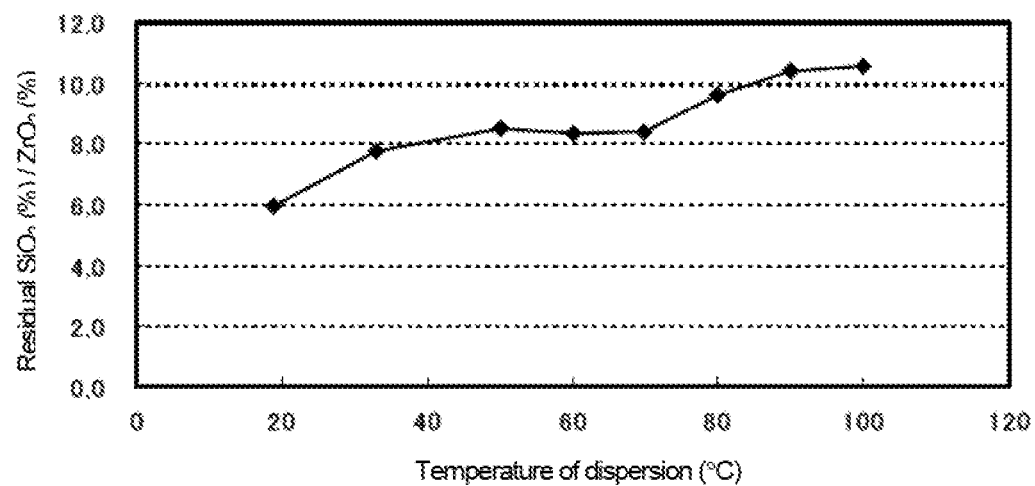
FIG. 4 is a graph showing the relationship between the temperature of the dispersion and the amount of $SiO_2/ZrO_2$ remaining in the frits.

FIG. 4 shows the relationship between the temperature of the dispersion (horizontal axis) and the amount of $SiO_2/ZrO_2$ remaining in the frits after water washing (vertical axis). Further, Table 1 below shows the relationship between the temperature of the dispersion, the amount of $SiO_2$, the amount of $ZrO_2$, and the amount of $SiO_2/ZrO_2$ remaining in the frits after water washing. The frits used herein are represented by the spectrum (a) in FIG. 3.

FIG. 4 and Table 1 indicate that when the temperature of the dispersion exceeds 70° C., the $SiO_2/ZrO_2$ value is greater than that when the temperature of the dispersion is 70° C. or less. This suggests that hydrolysis of sodium silicate is likely to proceed when the temperature of the dispersion exceeds 70° C., whereas hydrolysis thereof is suppressed when the temperature of the dispersion is 70° C. or less. Therefore, it is preferable to adjust the temperature of the dispersion to no higher than 70° C.

TABLE 1

| | Temperature of dispersion (° C.) | | | | | | | |
|---|---|---|---|---|---|---|---|---|
| | 19 | 33 | 50 | 60 | 70 | 80 | 90 | 100 |
| $ZrO_2$(%) | 67.32 | 68.90 | 69.94 | 67.73 | 68.98 | 69.48 | 69.38 | 69.62 |
| $SiO_2$(%) | 3.99 | 5.34 | 5.93 | 5.63 | 5.80 | 6.69 | 7.23 | 7.35 |
| $SiO_2/ZrO_2$ | 5.93 | 7.75 | 8.48 | 8.31 | 8.41 | 9.63 | 10.42 | 10.56 |

The means for adjusting the temperature of the dispersion is not particularly limited, and the temperature may be adjusted by a general cooling method. For example, at the laboratory level, the temperature of the dispersion can be adjusted using a cooling device, such as a chiller; and at the facility level or mass production level, the temperature of the dispersion can be adjusted using a heat exchanger, etc.

When the dispersion is prepared, the amount of water used and the amount of the frits obtained in step 4 may be adjusted so that the water/frit weight ratio is 1 or more.

The method for performing solid-liquid separation of the frits after water washing is not particularly limited, and can be, for example, a general filtration method using a filter press, a decompression suction filter, a precoat pressure filter, a centrifugal separator, or the like. A batch filter and a continuous filter can both be used. The cake obtained by filtration is preferably further washed with water. For example, water in an amount 5 times greater than the weight of the frits can be used. The water-washed cake is obtained in this manner.

When the sodium silicate solution removed by water washing is concentrated, sodium silicate crystals can be collected. The sodium silicate crystals can be used for other industrial raw materials. Moreover, since the main component of the solution from which the sodium silicate crystals are collected is sodium hydroxide, the solution can be recycled as sodium hydroxide for decomposing the zircon sand.

6. Step of Washing Water-Washed Cake with Hydrochloric Acid with a pH of 1 to 6

The method for producing an aqueous zirconium chloride solution according to the present invention comprises (6) a step of washing the water-washed cake obtained in step 5 with hydrochloric acid with a pH of 1 to 6 to thereby obtain zirconium hydrate (hereinafter simply referred to as "step 6").

The washed frits, from which sodium silicate has been removed by water washing in step 5, contain a large amount of sodium mainly derived from sodium zirconate. Accordingly, in order to remove the sodium, the washed frits are washed with hydrochloric acid with a predetermined pH in step 6. The sodium component in the fired product is thereby removed. Consequently, a high-purity aqueous zirconium chloride solution can be produced.

The compound obtained by removing sodium from sodium zirconate is considered to be zirconium hydrate ($ZrO(OH)_x$). Dissolution of the zirconium hydrate in acid is promoted at a pH of 1 or more. That is, sodium can be highly efficiently removed at a high acid concentration; however, depending on the acid concentration, zirconium hydrate is also eluted, causing a decrease in the yield. It is therefore necessary to adjust the acid concentration within a suitable range. In the acid washing process of step 6, first, the frits are dispersed in water in an amount that can sufficiently disperse the frits. Specifically, the dispersion may be prepared so that the water/frit weight ratio is 1 or more. Subsequently, hydrochloric acid is added to the dispersion. Hydrochloric acid may be used in combination with sulfuric acid, nitric acid, or the like; however, hydrochloric acid dissolution is performed in the subsequent step, and it is therefore preferable to use hydrochloric acid alone in step 6, in terms of preventing the incorporation of impurities.

Hydrochloric acid may be added so that the dispersion has a pH of 1 to 6, preferably a pH of 1.5 to 4, and more preferably a pH of 2 to 3. With strong acidity at a pH of less than 1, the removal of sodium is advanced; however, zirconium hydrate is also eluted, and the yield is reduced. With weak acidity at a pH of higher than 6, sodium cannot be efficiently removed from sodium zirconate.

Table 2 shows the relationship between the concentration of hydrochloric acid used in the acid washing process of step 6, the amount of sodium remaining in zirconium hydrate after acid washing, and the yield of zirconium hydrate. Table 2 suggests that with 0.3 N (N represents normality; hereinafter the same) hydrochloric acid with a pH of less than 1.0, the removal of sodium is advanced, whereas the yield of zirconium hydrate is reduced due to the elution of zirconium. On the other hand, when the pH is 7.0, it is found that the sodium component is not sufficiently removed.

TABLE 2

| | Hydrochloric acid concentration of dispersion | | | | | |
|---|---|---|---|---|---|---|
| | 0.3N | pH 1.0 | pH 2.5 | pH 4.0 | pH 6.0 | pH 7.0 |
| Na$_2$O wt. % (ZrO$_2$ ratio) | 0.03 | 0.06 | 0.19 | 0.43 | 0.96 | 3.47 |
| Yield of zirconium hydrate (%) | 75 | 94 | 98 | 99 | 99 | 99 |

When washing with hydrochloric acid is performed, the sodium removal reaction may be promoted by heating, as necessary. The heating may be conducted at 98° C. or less, and may be conducted before hydrochloric acid is added.

After the treatment with hydrochloric acid, as described above, solid-liquid separation may be performed. Although the method of solid-liquid separation is not particularly limited, it is preferable to use acid-resistant equipment, such as a filter press, a decompression suction filter, a precoat pressure filter, or a centrifugal separator, to all of which an acid-resistance treatment is applied. Solid-liquid separation may be performed in a batch or continuous manner. After solid-liquid separation, natural cooling may be performed, as necessary.

7. Step of Dissolution in Hydrochloric Acid and Removal of Silicon Compound

The method for producing an aqueous zirconium chloride solution according to the present invention comprises (7) a step of dissolving the zirconium hydrate obtained in step 6 in hydrochloric acid, and then removing insoluble components to thereby obtain a salt solution (hereinafter simply referred to as "step 7").

In step 7, first, the zirconium hydrate obtained in step 6 is dissolved in hydrochloric acid. The hydrochloric acid used for dissolution can be industrial hydrochloric acid. The concentration of hydrochloric acid is preferably 10 N or more. If hydrochloric acid with a concentration of less than 10 N is used, excessive time is required to dissolve the zirconium hydrate, and the zirconium hydrate cannot be sufficiently dissolved.

To dissolve the zirconium hydrate in hydrochloric acid, the zirconium hydrate may be dispersed in hydrochloric acid, and then heated to 90° C. or more, and more preferably 100 to 110° C. The heating time in this case is preferably 30 minutes or more, and more preferably 1 hour or more. If the heating time is less than 30 minutes, the zirconium hydrate may be insufficiently dissolved. The upper limit of the heating time is not particularly limited; however, no improvement in the effects can be expected even by extending the heating time to 2 hours or more, and thus, the upper limit may be about 2 hours, in terms of productivity. Since a large amount of hydrogen chloride gas vaporizes during the heating of hydrochloric acid, it is preferable to dissolve the zirconium hydrate while refluxing hydrogen chloride gas. After the zirconium hydrate is dissolved, water may be added to adjust the acid normality and zirconium concentration to desired levels.

As a result of the above dissolution treatment, a suspension is obtained. The suspension contains impurity components that do not dissolve in hydrochloric acid as insoluble components. The suspension obtained by the dissolution treatment is preferably cooled to 70° C. or less. The amount of silicate compound dissolved in the suspension as an impurity can be suppressed by cooling. The lower the cooling temperature, the lower the solubility of the silicate compound; therefore, the silicate compound is more likely to precipitate. Conversely, if the cooling temperature is too low, the target product, i.e., zirconium oxychloride, may also precipitate. Further, the viscosity of the suspension becomes high, and its filterability may be reduced. Therefore, it is generally preferable to set the cooling temperature to about 50 to 60° C. Further, the suspension may be diluted with water.

After the above cooling, the suspension is subjected to solid-liquid separation, and the silicate compound and insoluble components, such as undecomposed products, are removed from the suspension. Thereby, the target salt solution of the aqueous zirconium chloride solution is obtained. Although the method of solid-liquid separation is not particularly limited, it is preferable to use acid-resistant equipment, such as a filter press, a decompression suction filter, a precoat pressure filter, or a centrifugal separator, to all of which an acid-resistance treatment is applied. Solid-liquid separation may be conducted in a batch or continuous manner.

In the method for producing an aqueous zirconium chloride solution according to the present invention, the zircon sand is ground as described above, and the decomposition rate of the zircon sand is thus 95% or more. Accordingly, almost no zircon sand, which is a raw material, remains in the suspension. However, the slight amount of raw-material zircon sand that remains in the suspension may be recovered as an undissolved component in the hydrochloric acid dissolution step described above. In this case, the zircon sand can be supplied again as the raw material in step 2 mentioned above.

A flocculant may be added to the suspension. Due to the addition of a flocculant, impurities, such as the silicate compound, can be easily removed from the suspension, and solid-liquid separation can be performed more effectively. Examples of flocculants include polymer flocculants, such as cationic polymethacrylic acid esters, polyamines, nonionic polyacrylamide, polyethylene oxide, and polyvinyl alcohol. The amount of flocculant added is not particularly limited, but is preferably 0.5 to 5 wt. % based on the amount of the suspension. The method for adding such a flocculant is not particularly limited; however, it is preferable to add a flocculant in the form of an aqueous solution to the suspension, in terms of dispersibility.

The concentration of zirconium chloride in the aqueous zirconium chloride solution obtained in the above manner varies depending on the production conditions, but can be within the range of 1 to 20 wt. %, for example.

Since the method for producing an aqueous zirconium chloride solution according to the present invention comprises the seven steps, i.e., steps 1 to 7, the method can produce an aqueous zirconium chloride solution that has a higher decomposition rate of zircon sand and a lower content of impurities, such as sodium and iron, as compared with conventional methods.

It is not necessary to purify the aqueous zirconium chloride solution produced by the above method. Therefore, one step can be omitted in the production of various zirconium compounds, such as zirconium oxychloride, zirconium hydroxide, basic zirconium sulfate, and zirconium composite oxide. Consequently, these zirconium compounds can be produced efficiently and at low cost. In particular, when the aqueous zirconium chloride solution is, for example, neutralized by adding thereto an alkaline earth element (e.g., Mg, Ca, or Sr), lanthanoid (e.g., Sc, Y, or Ce), transition metal, or the like, a zirconium composite oxide having various functions can be obtained. In addition, according to the production method of the present invention, production facilities can be easily scaled-up, and capital investment costs can be reduced.

EXAMPLES

The features of the present invention are more clearly described below with reference to Examples; however, the present invention is not limited to these Examples.

Products obtained in the following Examples and Comparative Examples each contain hafnium oxide as an inevitable impurity in an amount of 1.3 to 2.5 wt. % based on the amount of zirconium oxide. The water used in the Examples and Comparative Examples was ion exchange water.

In the Examples and Comparative Examples, an ICP analyzer (SPS1200A, produced by Seiko Instruments Inc.) was used for the impurity analysis. In the ICP measurement, the amount of impurities was evaluated by measuring the content ratio (wt. %) of impurities with respect to $ZrO_2$, which was a main component.

The decomposition rate was calculated from the weight of the compound of zirconium and silicon (residue) remaining in the aqueous zirconium chloride solution, and the weight of the starting-material zircon sand. Specifically, the decomposition rate was calculated by the following formula:

Decomposition rate $(\%) = 100(\%) - (A/B) \times 100(\%)$.

In the formula, A is "the weight of the residue," and B is "the weight of the starting-material zircon sand."

Example 1

Zircon sand produced by ILUKA was used as the starting-material zircon sand, and an aqueous zirconium chloride solution was produced by the following steps 1 to 7.

Step 1: Grinding of Zircon Sand

The aforementioned zircon sand (1 kg) was placed in a 4-L resin pod containing 10 kg of stabilized zirconium oxide balls ($\phi$10 mm). Further, 1 kg of water was added, and the zircon sand was ground. The grinding treatment was continued for 20 hours, thereby obtaining a zircon sand slurry. The slurry was dried to a constant weight at 110° C. The average particle diameter ($D_{50}$) was about 1.2 µm. The average particle diameter was measured using a laser diffraction particle size analyzer SALD-2200 (produced by Shimadzu Corporation).

Step 2: Addition of Sodium Compound to Ground Zircon Sand

The zircon sand (100 g) ground in step 1 was placed in a 1-L iron container, and 271 g of 48 wt. % aqueous sodium hydroxide solution was then added. The $NaOH/ZrSiO_4$ weight ratio was 1.3. The sodium hydroxide used was industrial sodium hydroxide.

Step 3: Firing in Iron Container at 400° C. or Less (Primary Decomposition)

The raw materials were placed in a 1-L iron container, heated to 400° C. at a heating rate of 100° C./h using an electric furnace, and maintained at this temperature for 1 hour. Thereafter, the resultant was naturally cooled to room temperature. The obtained frits aggregated; accordingly, they were put into a plastic bag and coarsely ground with a wood hammer. The decomposition start temperature of the ground zircon sand used in step 3 was 300 to 350° C.

Step 4: Firing in Stainless-Steel Container at 400 to 1,100° C. (Secondary Decomposition)

The frits obtained in step 3 were placed in a 1-L stainless-steel (SUS304) container, heated to 800° C. at a heating rate of 100° C./h using an electric furnace, and maintained at this temperature for 1 hour. Thereafter, the resultant was naturally cooled to room temperature. The obtained frits were hygroscopic, and therefore stored by being sealed in a plastic bag.

Step 5: Washing of Frits with Water

Water (500 g) was placed in a 1-L beaker, and the beaker was fixed in an ice water bath. When the temperature of the water in the beaker reached about 10° C., the frits after secondary firing obtained in step 4 were placed in the beaker and stirred. At this time, the temperature of the water in the beaker rose to 30° C. After stirring for 10 minutes, solid-liquid separation was performed using a Buchner funnel, and the solid content was further washed with 500 g of water at ordinary temperature (25° C.). Thus, a water-washed cake was obtained.

Step 6: Washing of Water-Washed Cake with Acid with a pH of 1 to 6

The water-washed cake obtained in step 5 was dispersed in 500 g of water, and heated to 80° C. While maintaining this temperature, hydrochloric acid (SAJ first grade) was added to adjust the pH to 2, and the mixture was further maintained for 10 minutes. Thereafter, cooling was not performed, and solid-liquid separation was performed using a Buchner funnel. The obtained solid content (500 g) was further washed with water at ordinary temperature.

Step 7: Dissolution in Hydrochloric Acid and Removal of Silicon Compound

The cake washed with dilute hydrochloric acid obtained in step 6 was taken and dissolved in hydrochloric acid. The cake was placed in 200 g of concentrated hydrochloric acid (11N—$HCl_{aq}$) in a 1-L beaker, and the mixture was heated to 105° C. while stirring. By maintaining the mixture in this state for 30 minutes, the cake was almost completely dissolved, and a suspension was obtained. Water (160 g) was added to the suspension, stirring was stopped, and the resultant was naturally cooled to 50° C. After cooling, 0.5 g of 10 wt. % polyvinyl alcohol (molecular weight: 20,000, produced by Sanyo Chemical Industries, Ltd.) aqueous solution was added, the mixture was stirred for 10 minutes, and then allowed to stand for 1 hour. Thereafter, solid-liquid separation was performed using a Buchner funnel, thereby obtaining a target aqueous zirconium chloride solution.

Examples 2 to 9 and Comparative Examples 1 to 16

Aqueous zirconium chloride solutions were obtained in the same manner as in Example 1, except that the average particle diameter of the ground zircon sand in step 1 ($D_{50}$), the concentration of NaOH supplied in step 2, the container material and the firing temperature in step 3 (primary decomposition), the container material and the firing temperature in step 4 (primary decomposition), the maximum water temperature after water washing and dispersion in step 5, and the pH after the addition of hydrochloric acid in step 6 were changed as shown in Table 3, provided below. In Comparative Example 9, an aqueous zirconium chloride solution was obtained without performing secondary decomposition (step 4).

Table 4 shows the ICP measurement results of the aqueous zirconium chloride solutions obtained in Examples 1 to 9 and Comparative Examples 1 to 13, the decomposition rate, and notes.

TABLE 3

| | Average particle diameter ($D_{50}$) of ground zircon sand in step (1) (μm) | Concentration of NaOH added in step (2) (%) | NaOH/ $ZrSiO_4$ weight ratio | Primary decomposition step (3) Container material | Firing temp. (° C.) | Secondary decomposition step (4) Container material | Firing temp (° C.) | Max. water temp. after water washing and dispersion in step 5 (° C.) | pH after addition of hydrochloric acid in step (6) |
|---|---|---|---|---|---|---|---|---|---|
| Ex. 1 | 1.2 | 48 | 1.3 | Iron | 400 | Stainless-steel | 800 | 30 | 2 |
| Ex. 2 | 1.2 | 48 | 1.15 | Iron | 400 | Stainless-steel | 800 | 30 | 2 |
| Ex. 3 | 9.4 | 48 | 1.3 | Iron | 400 | Stainless-steel | 800 | 30 | 2 |
| Ex. 4 | 1.2 | 20 | 1.3 | Iron | 400 | Stainless-steel | 800 | 30 | 2 |
| Ex. 5 | 1.2 | 90 | 1.3 | Iron | 400 | Stainless-steel | 800 | 30 | 2 |
| Ex. 6 | 1.2 | 48 | 1.3 | Iron | 400 | Stainless-steel | 1100 | 30 | 2 |
| Ex. 7 | 1.2 | 48 | 1.3 | Iron | 400 | Stainless-steel | 800 | 70 | 2 |
| Ex. 8 | 1.2 | 48 | 1.3 | Iron | 400 | Stainless-steel | 800 | 30 | 1 |
| Ex. 9 | 1.2 | 48 | 1.3 | Iron | 400 | Stainless-steel | 800 | 30 | 4 |
| Comp. Ex. 1 | 21 | 48 | 1.3 | Iron | 400 | Stainless-steel | 800 | 30 | 2 |
| Comp. Ex. 2 | 105 | 48 | 1.3 | Iron | 400 | Stainless-steel | 800 | 30 | 2 |
| Comp. Ex. 3 | 1.2 | 48 | 1.3 | Stainless-steel | 400 | Stainless-steel | 800 | 30 | 2 |
| Comp. Ex. 4 | 1.2 | 48 | 1.3 | Alumina | 400 | Stainless-steel | 800 | 30 | 2 |
| Comp. Ex. 5 | 1.2 | 48 | 1.3 | Mullite | 400 | Stainless-steel | 800 | 30 | 2 |
| Comp. Ex. 6 | 1.2 | 48 | 1.3 | Iron | 800 | — | — | 30 | 2 |
| Comp. Ex. 7 | 1.2 | 48 | 1.3 | Iron | 400 | Iron | 800 | 30 | 2 |
| Comp. Ex. 8 | 1.2 | 48 | 1.3 | Iron | 400 | Alumina | 800 | 30 | 2 |
| Comp. Ex. 9 | 1.2 | 48 | 1.3 | Iron | 400 | Mullite | 800 | 30 | 2 |
| Comp. Ex. 10 | 1.2 | 48 | 1.3 | Iron | 400 | Stainless-steel | 1200 | 30 | 2 |
| Comp. Ex. 11 | 1.2 | 48 | 1.3 | Iron | 400 | Stainless-steel | 800 | 90 | 2 |
| Comp. Ex. 12 | 1.2 | 48 | 1.3 | Iron | 400 | Stainless-steel | 800 | 30 | 0.3N |
| Comp. Ex. 13 | 1.2 | 48 | 1.3 | Iron | 400 | Stainless-steel | 800 | 30 | 7 |

TABLE 4

| | | $ZrO_2$ Main component | $SiO_2/ZrO_2$ | $Na_2O/ZrO_2$ | $Fe_2O_3/ZrO_2$ | $Cr_2O_3/ZrO_2$ | $NiO/ZrO_2$ | $Al_2O_3/ZrO_2$ | Decomposition rate | Notes |
|---|---|---|---|---|---|---|---|---|---|---|
| | | | | | Impurity | | | | | |
| | | wt. % | wt. % | wt. % | wt. % | wt. % | wt. % | wt. % | % | |
| Ex. | 1 | 17.3 | 0.05 | 0.12 | 0.03 | <0.01 | <0.01 | 0.03 | 99.5 | Primary decomposition: 300-350° C. |
| | 2 | 17.0 | 0.12 | 0.19 | 0.03 | <0.01 | <0.01 | 0.03 | 99.0 | NaOH ratio: 1.15 |
| | 3 | 17.1 | 0.05 | 0.13 | 0.03 | <0.01 | <0.01 | 0.03 | 99.2 | Primary decomposition: 400° C. |

TABLE 4-continued

| | | ZrO$_2$ Main component | SiO$_2$/ ZrO$_2$ | Na$_2$O/ ZrO$_2$ | Fe$_2$O$_3$/ ZrO$_2$ | Cr$_2$O$_3$/ ZrO$_2$ | NiO/ ZrO$_2$ | Al$_2$O$_3$/ ZrO$_2$ | Decomposition rate | |
|---|---|---|---|---|---|---|---|---|---|---|
| | | | | | Impurity | | | | | |
| | | | | | Unit | | | | | |
| | | wt. % | wt. % | wt. % | wt. % | wt. % | wt. % | wt. % | % | Notes |
| | 4 | 17.2 | 0.06 | 0.12 | 0.03 | <0.01 | <0.01 | 0.03 | 99.4 | Primary decomposition: 300-350° C. |
| | 5 | 17.2 | 0.06 | 0.12 | 0.03 | <0.01 | <0.01 | 0.03 | 99.5 | Primary decomposition: 300-350° C. |
| | 6 | 17.4 | 0.04 | 0.08 | 0.03 | <0.01 | <0.01 | 0.03 | 99.7 | Significant aggregation of frits |
| | 7 | 17.0 | 0.08 | 0.11 | 0.03 | <0.01 | <0.01 | 0.03 | 99.6 | Si incorporated into salt solution (slight increase) |
| | 8 | 16.8 | 0.03 | 0.04 | 0.03 | <0.01 | <0.01 | 0.03 | 99.7 | Slight increase in Zr elution during washing with dilute hydrochloric acid |
| | 9 | 17.3 | 0.09 | 0.38 | 0.03 | <0.01 | <0.01 | 0.03 | 99.4 | Na remains in salt solution |
| Comp. Ex | 1 | 16.5 | 0.05 | 0.13 | 0.03 | 0.12 | 0.07 | 0.03 | 97.7 | No primary decomposition; Cr and Ni incorporated during secondary decomposition |
| | 2 | 15.8 | 0.06 | 0.12 | 0.03 | 0.15 | 0.09 | 0.03 | 96.0 | No primary decomposition; Cr and Ni incorporated during secondary decompositon |
| | 3 | 17.2 | 0.05 | 0.11 | 0.02 | 0.13 | 0.06 | 0.03 | 99.5 | Cr and Ni incorporated |
| | 4 | 16.1 | 0.67 | 0.27 | 0.02 | <0.01 | <0.01 | 1.5 | 92.6 | Alumina container corroded; Al incorporated |
| | 5 | 16.0 | 0.81 | 0.29 | 0.03 | <0.01 | <0.01 | 0.7 | 91.3 | Mullite container corroded; Al and Si incorporated |
| | 6 | 17.1 | 0.09 | 0.15 | 0.93 | <0.01 | <0.01 | 0.03 | 99.5 | Iron container corroded; Fe incorporated |
| | 7 | 17.3 | 0.08 | 0.15 | 1.06 | <0.01 | <0.01 | 0.03 | 99.3 | Iron container corroded; Fe incorporated (Iron powder) |
| | 8 | 17.0 | 0.05 | 0.13 | 0.02 | <0.01 | <0.01 | 0.59 | 99.1 | Alumina container corroded; Al incorporated |
| | 9 | 16.8 | 0.37 | 0.14 | 0.02 | <0.01 | <0.01 | 0.44 | 99.0 | Mullite container corroded; Al and Si incorporated |
| | 10 | 16.1 | 0.19 | 0.25 | 0.03 | <0.01 | <0.01 | 0.03 | 97.1 | Increase in undecomposed material |
| | 11 | 17.0 | 0.22 | 0.02 | 0.03 | <0.01 | <0.01 | 0.03 | 99.5 | Si incorporated into salt solution |
| | 12 | 16.3 | 0.07 | 0.01 | 0.03 | <0.01 | <0.01 | 0.03 | 99.4 | Zr eluted |
| | 13 | 17.0 | 0.16 | 2.55 | 0.03 | <0.01 | <0.01 | 0.03 | 99.4 | Na incorporated into salt solution |

As is clear from Table 4, all of Examples 1 to 9 produced aqueous zirconium chloride solutions in which the decomposition rate of zircon sand was high, and the incorporation of impurities was suppressed. In Example 6, the frits after secondary decomposition aggregated; however, the resulting aqueous zirconium chloride solution was highly pure. In Example 7, the amount of the silicon component in the aqueous zirconium chloride solution slightly increased, but was not a problematic level. In Example 8, the amount of sodium component slightly increased (as the measured value when the pH of the aqueous zirconium chloride solution was 4), but was not a problematic level as an aqueous zirconium chloride solution because the amount of other impurity components was low.

On the other hand, in Comparative Examples 1 and 2, primary decomposition did not occur because the average particle diameter ($D_{50}$) of the zircon sand exceeded 10 μm. Therefore, a large amount of alkali remained in the heated product, and chromium and nickel from the stainless-steel container were incorporated during secondary decomposition. Further, the decomposition rate was low in Comparative Examples 1 and 2. In Comparative Examples 3 to 5, an iron container was not used in the primary decomposition, and stainless steel, alumina, and mullite were used, respectively. Accordingly, the purity of the resulting aqueous zirconium chloride solutions was lower. In Comparative Example 6, secondary decomposition using a stainless-steel container was not performed, and only primary decomposition using an iron container was performed. Accordingly, a larger amount of iron was incorporated into the aqueous zirconium chloride solution. In Comparative Examples 7 to 9, containers other than a stainless-steel container were used in the secondary decomposition; accordingly, the amount of impurity elements eluted from the containers was higher. In Comparative Example 10, the secondary decomposition temperature exceeded 1,100° C.; accordingly, incorporation of impurities into the resulting aqueous zirconium chloride solution was observed. In Comparative Example 11, the water temperature during water washing exceeded 70° C.; accordingly, the amount of silicon incorporated into the aqueous zirconium chloride solution was higher. In Comparative Example 12, the pH during acid washing of the water-washed cake was below 1; accordingly, a larger amount of Zr was eluted, and the yield was lower (see Table 2). In Comparative Example 13, the pH during acid washing of the water-washed cake exceeded 6; accordingly, the amount of sodium incorporated into the aqueous zirconium chloride solution was higher.

INDUSTRIAL APPLICABILITY

The method for producing an aqueous zirconium chloride solution according to the present invention can produce an aqueous zirconium chloride solution in which the decomposition rate of zircon sand is high, and the content of impurities, such as sodium and iron, is suppressed to a low level. Therefore, various zirconium compounds, such as zirconium oxychloride, zirconium hydroxide, basic zirconium sulfate, and zirconium composite oxide, can be produced without purifying the aqueous zirconium chloride solution. Further, such zirconium compounds can be produced at low cost. In addition, according to the production method of the present invention, production facilities can be easily scaled-up, and capital investment costs can be reduced. Therefore, the present invention is useful in the fields of various chemical industry products. Moreover, the produced aqueous zirconium chloride solution can be used as a raw material for producing various chemicals, and can also be applied to various additives, catalysts, etc.

The invention claimed is:

1. A method for producing an aqueous zirconium chloride solution, the method comprising:
   (1) step 1 Of grinding zircon sand to an average particle diameter of 10 μm or less;
   (2) step 2 of adding a sodium compound to the ground zircon sand in (1) to thereby obtain a mixture;
   (3) step 3 of firing the mixture in (2) in an iron container at 400° C. or less to thereby obtain a decomposed product;
   (4) step 4 of firing the decomposed product in (3) in a stainless-steel container at 400 to 1,100° C. to thereby obtain a fired product;
   (5) step 5 of dispersing the fired product in (4) in water to prepare a dispersion, and washing the fired product with water while adjusting the temperature of the dispersion to 70° C. or lower, thereby obtaining a water-washed cake;
   (6) step 6 of washing the water-washed cake in (5) with hydrochloric acid with a pH of 1 to 6 to thereby obtain zirconium hydrate; and
   (7) step 7 of dissolving the zirconium hydrate in (6) in hydrochloric acid, and then removing insoluble components to thereby obtain a salt solution.

2. The method for producing an aqueous zirconium chloride solution according to claim 1, wherein the zircon sand in (1) is ground to an average particle diameter of 2 μm or less.

3. The method for producing an aqueous zirconium chloride solution according to claim 1, wherein the sodium compound in (2) is a 20 to 90 wt. % aqueous sodium hydroxide solution.

4. The method for producing an aqueous zirconium chloride solution according to claim 1, wherein the temperature of the dispersion in (5) is adjusted to 40° C. or less.

5. The method for producing an aqueous zirconium chloride solution according to claim 2, wherein the sodium compound in (2) is a 20 to 90 wt. % aqueous sodium hydroxide solution.

6. The method for producing an aqueous zirconium chloride solution according to claim 2, wherein the temperature of the dispersion in (5) is adjusted to 40° C. or less.

7. The method for producing an aqueous zirconium chloride solution according to claim 3, wherein the temperature of the dispersion in (5) is adjusted to 40° C. or less.

* * * * *